United States Patent

Hartman et al.

[11] Patent Number: 5,549,918
[45] Date of Patent: Aug. 27, 1996

[54] MONOLAYER CURL-SALTING PROCESS AND APPARATUS

[75] Inventors: Brian W. Hartman, Carrollton; Lillian R. Juranovic, Irving; Stephen C. Scannell, Dallas; Rogers B. Williams, Carrollton, all of Tex.

[73] Assignee: Recot, Inc., Pleasanton, Calif.

[21] Appl. No.: 420,258

[22] Filed: Apr. 11, 1995

[51] Int. Cl.$^6$ .................................................. A23L 1/217
[52] U.S. Cl. .......................... 426/291; 426/292; 426/302; 426/303; 426/466; 426/560
[58] Field of Search ...................... 426/291, 292, 426/302, 303, 466, 560

[56] References Cited

U.S. PATENT DOCUMENTS

| 3,278,311 | 10/1966 | Brown et al. | 99/80 |
| 3,682,652 | 8/1969 | Corbin et al. | 426/303 |
| 3,883,671 | 5/1975 | Shatila | 426/303 |
| 4,844,919 | 7/1989 | Szwerc | 426/94 |
| 4,978,548 | 12/1990 | Cope et al. | 426/439 |
| 4,985,269 | 1/1991 | Irvin et al. | 426/560 |
| 5,298,268 | 3/1994 | Maegli | 426/93 |

*Primary Examiner*—Helen Pratt
*Attorney, Agent, or Firm*—Jones, Day, Reavis & Pogue

[57] ABSTRACT

A water spray process for providing moisture to chip-type food products to cause them to curl when dried. The amount of curling is directly related to the amount of moisture applied to the top surface of the chips. Following the water spray addition, the product may be transferred to a salting conveyor where salt may be deposited in a continuous curtain onto the top surface of the product. The water sprayed top surface provides the adhesive for the salt.

11 Claims, 1 Drawing Sheet

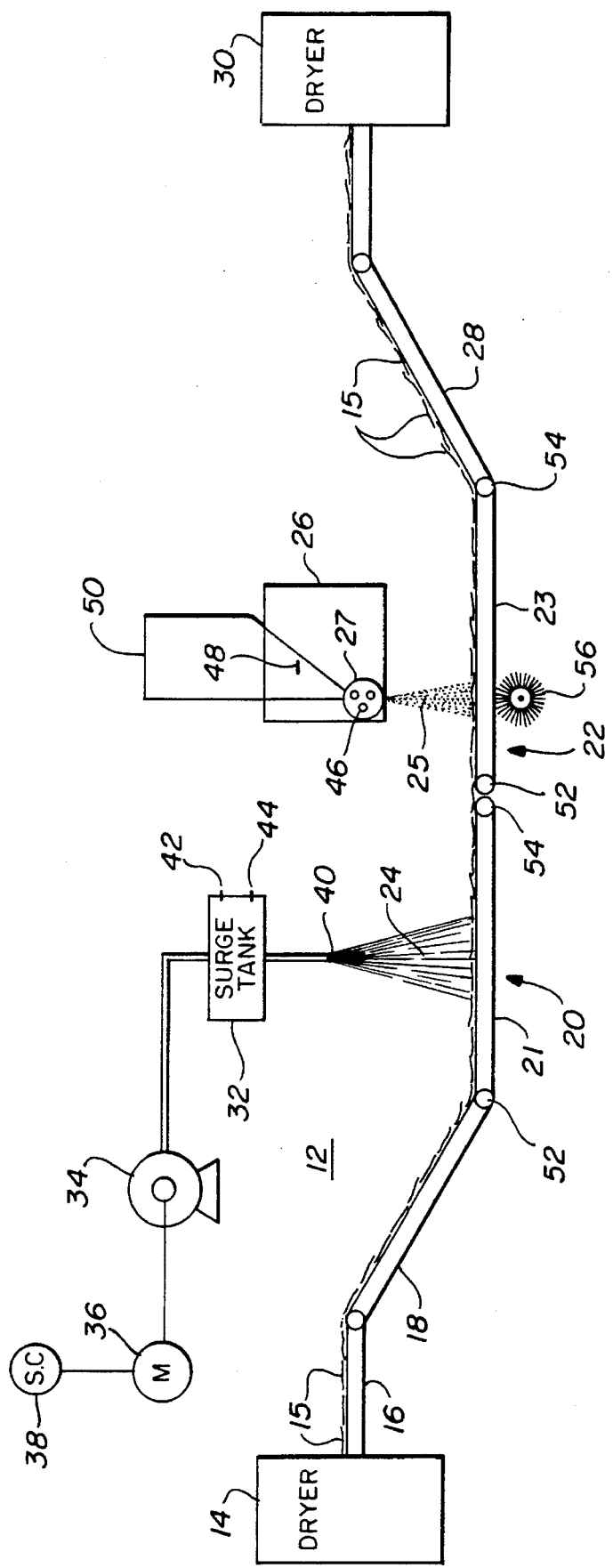
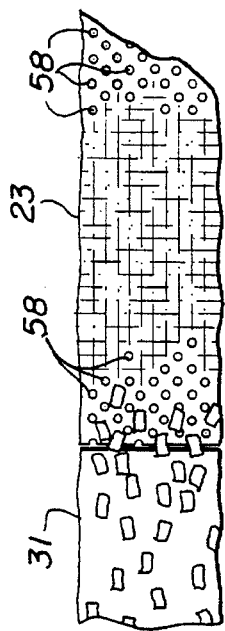
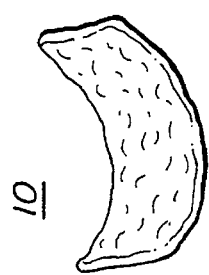
FIG. 1
FIG. 2
FIG. 3

5,549,918

MONOLAYER CURL-SALTING PROCESS AND APPARATUS

BACKGROUND OF THE INVENTION

1. Field of the Invention

The present invention relates in general to a curling system for snack foods and specifically to a water spray-salting process that provides control for the amount of curl of the product (affecting the bulk density) as well as providing an adhesive for salt for low or no oil bearing food snacks.

2. Description of Related Art

Curled snack foods are generally well known in the art and many patents exist that disclose processes for flavoring snack foods. U.S. Pat. No. 5,298,268 discloses a seasoned cereal based snack food having a low fat and low moisture content edible adhesive on the surfaces thereof for adhering dry solids as seasoning to the surfaces of the snack food. The adhesive comprises an at least partially amorphous form of a mixture of at least one monosaccharide and at least one polyhydric, aliphatic, saturated alcohol having 3 to 6 carbon atoms. The adhesive is disposed on the surfaces of the snack food and usually a relatively uniform disposition of the adhesive is applied on substantially all surfaces of the snack food. In the process, the mixture of the adhesive is formed, heated, and cooled and then is sprayed onto the snack food to coat the surfaces with the mixture. Seasoning is then applied to the food and the snack food is cooled.

In U.S. Pat. No. 4,844,919, there is disclosed a process for preparing a concave shaped snack food. In this case, the snack food is coated with a fused, substantially continuous particulate flavored topping composition. The coating composition covers the upper surface of the dough base without significant breaks in the coating. The coating forms a barrier to loss of moisture from the upper surface of the dough sheet and, as the dough base expands, when heated, sufficient resistance is present in the coating to cause the desired deformation to take place.

U.S. Pat. No. 4,985,269, discloses a method of spraying tortilla chips with oil and then salts them by passing the oiled pieces through a rotary tumbler where salt is applied by dusting the salt on all surfaces of the pieces.

U.S. Pat. No. 4,978,548, discloses a method and apparatus for continuously producing tortilla chips that are fried and then passed through a salter. There is no disclosure as to how the salting apparatus functions.

SUMMARY OF THE INVENTION

The present invention discloses a water spray-salting process that provides control for bulk density as well as an adhesive for a seasoning such as salt on low oil or no oil snacks.

The baked chips exit a dryer in a monolayer and are transferred, retaining that monolayer, onto a water spray conveyor. A series of fixed nozzles continuously sprays water onto only the top surface of the chips. Following the water spray addition, the product is transferred to a salting conveyor where a roll salter, old and well known in the art, deposits a continuous curtain of salt on the top surface of the product. Spraying the water on the top surface of the chips causes a moisture gradient between the top and bottom of the chip that causes the product surfaces to dry at different rates inside the finishing dryer. The differential drying of the surfaces causes the product to curl in the direction of the water sprayed surface. The water sprayed top surface also provides the adhesive for the seasoning such as salt. The water melts some of the salt crystals which fuse to the chip when dried and recrystallize in the finishing dryer. The amount of water is controlled and adjustable to deliver different levels of curl to the product. The greater the curl of the food product, the lesser the product in bulk density.

Following the salting conveyor, the chips are dried to their desired moisture content in the final drying process. The system can be used as either a curl-salting system for a salted product or a curling only system for unsalted or unseasoned versions. Bulk density is controlled by manipulating the curl level that is controlled, as stated earlier, by the amount of water applied to the top surface of the food product. As the curl level is increased, the bulk density decreases.

Thus, it is an object of the present invention to provide a simple process for causing curling of a flat food snack.

The present invention also relates to the process of causing a flat food product to curl by spraying the top surface thereof with water and then baking the food product with the top water sprayed surface drying at a different rate than the bottom nonsprayed surface. The differential drying causes the product to curl in the direction of the water sprayed surface.

It is still another object of the present invention to control the bulk density of the product by controlling the amount of water sprayed onto the top surface of the product.

It is also another object of the present invention to provide an oil free salt adhesion process in which salt is applied to that side of the food product that has been water sprayed. In such case the salt will stick to the watered surface and thus the water acts as an adhesive for the salt.

Thus the present invention relates to a process for curling a chip product such as a baked chip food product comprising the steps of moving a conveyor belt containing a monolayer of baked chips having an exposed top surface and a nonexposed bottom surface under a moisture applying device, spraying a continuous curtain of moisture on only the top surface of the baked chips as the conveyor belt moves the baked chips under the moisture applying device, and drying the baked chips, the moisture differential between the top and bottom surfaces of said baked chips being such that the top of the baked chip drys at a different rate than the bottom of the baked chip thereby causing the baked chip to curl as it dries.

The invention also relates to apparatus for forming a curled chip product such as a baked chip food product comprising a conveyor containing a monolayer of baked chips having an exposed top surface and a nonexposed bottom surface, a moisture applying device for spraying a continuous curtain of moisture on only the top surface of the baked chips as the conveyor belt moves the baked chips under the moisture applying device, and a drying apparatus for drying the baked chips, the moisture differential between the top and bottom surfaces of the baked chips being such that the top of the baked chip dries at a different rate than the bottom of the baked chip thereby causing the baked chip to curl as it dries.

BRIEF DESCRIPTION OF THE DRAWINGS

These and other objects of the present invention will be more fully disclosed when taken in conjunction with the following DETAILED DESCRIPTION OF THE DRAW- INGS in which like numerals represent like elements and in which:

FIG. 1 discloses an isometric view of a baked chip food product of the present invention that has been curled in at least one direction;

FIG. 2 is a schematic side view of the apparatus performing the process of the present invention and illustrating the various stages thereof; and FIG. 3 is a top view of the conveyor belt under the salting operation illustrating open areas in the salting conveyor belt that are maximized to minimize the potential for salt buildup.

DETAILED DESCRIPTION OF THE DRAWINGS

FIG. 1 is an isometric view of a sample of a curled chip product such as a baked chip food product that can be manufactured by the present invention. While it is shown curled in only one plane, it will also be generally curled in intersecting planes.

FIG. 2 is a side view of an apparatus system for accomplishing the process of the present invention. The system 12 includes a dryer 14 in which the flat baked chip food product is dried to a point that they contain 5% to 10% water and are relatively rigid with neither the top nor bottom surfaces sticky. The chips 15 are in an organized monolayer pattern on upstream conveyor 16. The chips 15 are carried from conveyor belt 16 to conveyor 18 where they are carried through two process zones—a liquid spray zone 20 and a salting zone 22. In the liquid spray zone 20, a liquid such as water 24 is applied in a spray onto the top surface of the chips 15. In the salting zone 22, salt 25 is applied onto the wet chip surface by a rotary salter 26 that is well known in the art. After the application of salt 25, the chips 15 are gently deposited onto a downstream inclined conveyor 28 and carried to a dryer 30 to remove the added water, curl the chips 15, and adhere the salt 25 to the chip surface. The liquid could contain flavorings, seasonings, and the like as desired.

Water 24 is applied with a uniformity of 5% maximum deviation from an average based on chip weight testing. Thus, for instance, the water application rate may be 100 to 300 pounds per hour with an average based chip weight of 0.072 lb/ft. Water droplet size is similar to that produced from a Spraying Systems Inc. Nozzle Tip Model Unijet No. 11001 at 20 psig. The water droplet size is approximately 200–400 microns. The water spray system includes a water surge tank 32, positive displacement pump 34 driven by a motor 36 that is controlled by a speed controller 38. A spray manifold 40, extending across and perpendicular to the direction of the conveyor belt movement, provides the water spray to the product. The water surge tank 32 may contain 100 gallons at atmospheric pressure and has an enclosed top on the tank to prevent contamination. High and low level sensors 42 and 44 may be provided in the tank to control the water level. The operator can adjust the water application rate by adjusting the speed control 38 to change the speed of the motor 36 driving pump 34. The nozzle of the spray manifold 40 has an orientation that is perpendicular to the belt surface. Fan-type nozzles, well known in the art, may be used in the manifold 40 and are preferred to maximize application uniformity. Where edges of fan water sprays are tapered, the sprays overlap to provide a substantially constant application rate across the width of the belt.

Salter 26 applies salt with the uniformity of 5% maximum deviation from an average based on a batch testing. Thus the operator can adjust the salt application rate to obtain desired product specifications. The salter roll 27 is designed as is well known in the art to dispense a curtain of fine flake salt. The salter roll 27 may have shafts 46 drilled through to the hollow roll core, so that hot water may be circulated through the roll to reduce water absorption by the salt. The salter roll 27 is enclosed to prevent exposure to excess moisture which may rise from the product bed. It is critical that water not adversely affect the salter's accuracy and reliability performance. A low level sensor 48 may be provided in the salt hopper 50 and located as low as possible to minimize salt retention time in the salt hopper for less water absorption.

The chips 15 are transferred off the upstream belts 16 and 18 with a loss of product orientation no more than 0.25 inches between chips. The conveyors 21 and 23 in the water zone 20 and the salt zone 22, respectively, are horizontal to prevent chips 15 from sliding. Both the infeed 52 and discharge ends 54 of each conveyor 21 and 23 shall be small radius rollers such as ½ to 1 inch diameter. The horizon tip-to-tip distance between discharge roller 54 on conveyor 21, the wet conveyor, and the input roller 52 of conveyor 23, the dry conveyor, shall be adjustable from ¼ to 1 inch to minimize water transfer from the watering zone 20 to the salting zone 22. A rotating nylon brush 56 is provided on the return pass of the dry zone 22 conveyor belt 23 to prevent salt accumulation.

The conveyor belting may be stainless steel balanced weave made by Ashworth Brothers, Inc. Further, the open area 58 of the salting conveyor belt 23 should be maximized as illustrated in FIG. 3 to minimize the potential for salt buildup. Of course, catch pans, drain pans and the like can be provided as needed to collect fallen crumbs, excess water, and excess salt.

All metal components may be 304 stainless steel as a minimum. Drive components such as motors, gearboxes, chains, sprockets, bearings and the like may be nonstainless. Rollers and drums may be nickel plated and/or rubber coated as is well known in the art.

The final dryer 30 may dry the chips to the desired moisture content in the range of 0.75 to 1.25%, preferably 1%.

Thus there has been disclosed a novel water spray-salting process that provides control for bulk density as well as an adhesive for salt for low oil and/or no oil snacks.

The baked chips exit in a dryer in a monolayer and are transferred retaining that monolayer onto a water spray conveyor. A series of nozzles spray a continuous curtain/fan of water onto the top surface of the chips. Following the water spray addition, the product is transferred to a salting conveyer where a roll salter, old and well known in the art, deposits a continuous curtain of salt onto the top surface of the product. This causes a moisture differential between the top and bottom surfaces of the chip that causes the product to dry at different rates when inside the finishing dryer. The differential drying causes the product to curl in the direction of the water sprayed surface. The water sprayed top surface also provides adhesive for salt. The amount of water is controlled and adjustable to deliver different levels of curl.

Following the salting conveyor, the chips are dried to their desired moisture content of 0.75 to 1.25%, preferably 1% in the final drying process. Clearly, the system can be used as a curl/salting system for a salted product or simply as a curling system for unsalted or unseasoned products. Further, bulk density is controlled by manipulating the curl level which is related to the amount of moisture applied to the top surface thereof. As the curl level is increased, the bulk density decreases.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A process for curling chip food product comprising the steps of:

moving a conveyor containing a monolayer of chips under a moisture-applying device, the chips having an exposed top surface and a nonexposed bottom surface;

spraying a continuous curtain of moisture on only the exposed top surface of the chips as the conveyor belt moves the chips under the moisture-applying device; and drying the chips, the moisture differential between the top and bottom surfaces of said chips being such that the tops of the chips dry at a different rate than the bottom of the chips, thereby causing the chips to curl as they dry.

2. A process as in claim 1 further comprising the step of adjusting the amount of the moisture sprayed on the chips to adjust the amount of curl.

3. A process as in claim 2 wherein the moisture applied to the top surface of the chips is water.

4. A process as in claim 3 further including the step of adding at least one of a flavoring and a seasoning to said water that is sprayed on said chips.

5. A process as in claim 1 further including the step of sprinkling salt on said chip after the step of spraying with said moisture but prior to the step of drying said chip, the moisture on said top surface of said chip providing an adhesive for said salt.

6. A process as in claim 1 further including the step of drying said chips, before being placed on said conveyor in a monolayer, such that they have a moisture content in the range of about 5% to 10% water and are relatively rigid with neither the top nor bottom surface sticky.

7. Apparatus for curling a chip food product comprising:

a conveyor system for moving a monolayer of chips having an exposed top surface and a nonexposed bottom surface;

a moisture-applying device above the conveyor system for providing moisture only to the exposed top surface of said monolayer of chips; and a heating device for drying said moistened monolayer of chips to cause said chips to curl, the moisture differential between the top and bottom of said chips being such that the top of the chips dries at a different rate than the bottom of the chips so as to cause the chips to curl as they dry.

8. Apparatus as in claim 7 further comprising means for adjusting the amount of moisture sprayed on said chips to adjust the amount of curl thereof.

9. Apparatus as in claim 8 wherein the moisture that is sprayed on said chips is water.

10. Apparatus as in claim 9 further including an additive such as a flavoring or a seasoning added to said water sprayed on said chips to improve flavor and quality of the chips.

11. Apparatus as in claim 7 further including a salt-sprinkling mechanism for sprinkling salt on said chips after spraying said chips with said moisture but prior to drying said chips, the moisture on said top surface of said chips providing an adhesive for said salt.

* * * * *